(12) United States Patent
Chambliss et al.

(10) Patent No.: US 7,349,958 B2
(45) Date of Patent: Mar. 25, 2008

(54) METHOD FOR IMPROVING PERFORMANCE IN A COMPUTER STORAGE SYSTEM BY REGULATING RESOURCE REQUESTS FROM CLIENTS

(75) Inventors: David Darden Chambliss, Morgan Hill, CA (US); Divyesh Jadav, San Jose, CA (US); Tzongyu Paul Lee, Campbell, CA (US); Ramachandran Gopalakrishna Menon, Sunnyvale, CA (US); Prashant Pandey, Fremont, CA (US); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 10/603,881

(22) Filed: Jun. 25, 2003

(65) Prior Publication Data

US 2004/0267916 A1 Dec. 30, 2004

(51) Int. Cl.
*G06F 15/173* (2006.01)
(52) U.S. Cl. .................. 709/223; 709/203; 709/212; 709/219; 707/1; 710/15; 710/20; 711/100
(58) Field of Classification Search ................ 709/203, 709/212, 219, 224, 223; 707/1; 710/15; 710/20; 711/100
See application file for complete search history.

(56) References Cited

U.S. PATENT DOCUMENTS

| 5,548,760 | A | 8/1996 | Healey |
| 6,167,423 | A | 12/2000 | Chopra et al. |
| 6,457,098 | B1 * | 9/2002 | DeKoning et al. .......... 711/114 |
| 6,484,224 | B1 | 11/2002 | Robins et al. |
| 6,681,232 | B1 * | 1/2004 | Sistanizadeh et al. ..... 707/104.1 |
| 6,701,342 | B1 * | 3/2004 | Bartz et al. ................. 709/200 |
| 6,816,905 | B1 * | 11/2004 | Sheets et al. ............... 709/226 |
| 6,915,386 | B2 * | 7/2005 | Doyle et al. ................ 711/133 |
| 7,082,463 | B1 * | 7/2006 | Bradley et al. ............. 709/223 |
| 2001/0027484 | A1 * | 10/2001 | Nishi ......................... 709/223 |
| 2002/0039352 | A1 * | 4/2002 | El-Fekih et al. ............ 370/252 |
| 2002/0049841 | A1 * | 4/2002 | Johnson et al. ............ 709/225 |
| 2002/0087680 | A1 * | 7/2002 | Cerami et al. ............. 709/224 |
| 2002/0091722 | A1 * | 7/2002 | Gupta et al. ............... 707/204 |

(Continued)

FOREIGN PATENT DOCUMENTS

TW 466434 12/2001

OTHER PUBLICATIONS

Kritchal Thitikamol and Peter J. Keleher, "Active Correlation Tracking," 1999, (324-331), Distributed Computing Systems, 1999. Proceedings. 19th IEEE International Conference on, 1999.

(Continued)

*Primary Examiner*—Michael Won
(74) *Attorney, Agent, or Firm*—William K. Konrad; Konrad Raynes & Victor LLP

(57) ABSTRACT

The present invention discloses a method, apparatus and program storage device for providing non-blocking, minimum threaded two-way messaging. A Performance Monitor Daemon provides one non-blocked thread pair per processor to support a large number of connections. The thread pair includes an outbound thread for outbound communication and an inbound thread for inbound communication. The outbound thread and the inbound thread operate asynchronously.

15 Claims, 8 Drawing Sheets

U.S. PATENT DOCUMENTS

| | | | |
|---|---|---|---|
| 2002/0103969 A1* | 8/2002 | Koizumi et al. | 711/114 |
| 2002/0194324 A1* | 12/2002 | Guha | 709/223 |
| 2003/0005114 A1 | 1/2003 | Shavit et al. | |
| 2003/0009444 A1* | 1/2003 | Eidler et al. | 707/1 |
| 2003/0028642 A1* | 2/2003 | Agarwal et al. | 709/226 |
| 2003/0041163 A1* | 2/2003 | Rhoades et al. | 709/232 |
| 2003/0043821 A1* | 3/2003 | Van Den Bosch et al. | 370/400 |
| 2003/0055972 A1* | 3/2003 | Fuller et al. | 709/226 |
| 2003/0126202 A1* | 7/2003 | Watt | 709/203 |
| 2004/0181476 A1* | 9/2004 | Smith et al. | 705/35 |
| 2004/0205206 A1* | 10/2004 | Naik et al. | 709/230 |
| 2004/0236846 A1* | 11/2004 | Alvarez et al. | 709/223 |
| 2004/0243699 A1* | 12/2004 | Koclanes et al. | 709/224 |
| 2005/0066026 A1* | 3/2005 | Chen et al. | 709/224 |

OTHER PUBLICATIONS

Kai Shen, Hong Tang, and Tao Yang, "Adaptive Two-level Thread Management for Fast MPI Execution on Shared Memory Machines," 1999, http://www.cs.ucsb.edu/research/tmpi.

Guy A. Schiavone, Iulian Codreanu, Ravishankar Palaniappan and Parveen Wahid, "FDTD Speedups Obtained in Distributed Computing on a Linux Workstation Cluster," 2000, v3 (1336-1339), IEEE Antennas and Propagation Society International Symposium 2000.

* cited by examiner

METHOD FOR IMPROVING PERFORMANCE IN A COMPUTER STORAGE SYSTEM BY REGULATING RESOURCE REQUESTS FROM CLIENTS

BACKGROUND OF THE INVENTION

1. Field of the Invention

This invention relates in general to inter-process communication, and more particularly to a method, apparatus and program storage device for providing non-blocking, minimum threaded two-way messaging.

2. Description of Related Art

Today business and personal activities generate an astonishing amount of electronic information that must be managed. Such management involves transmitting, receiving, processing, and storing electronic data. Data processing systems with multiple input/output (I/O) storage subsystems have been developed to manage this large volume of data. Data processing systems with multiple input/output (I/O) storage subsystems generally have multiple independent communication paths between at least one processor and each storage system. A typical data processing system includes clients that have an application program and an operating system. Further, in a typical data processing system, clients request data that is stored in various types of storage devices via at least one storage controller. High availability is provided by redundancy of the storage subsystems, multiple I/O channels, multiple controller paths in the storage controller, and multiple communication links between the storage controller and the storage devices. However, such system designs cannot guarantee delivery of data at specified service levels.

The requirement for service level agreements has created a demand for accountability that transcends enterprise and service provider environments. A Service Level Agreement (SLA) is a contract between a network service provider and a customer that specifies, usually in measurable terms, what services the network service provider will furnish. IT departments in major enterprises have adopted the idea of writing a Service Level Agreement so that services for their customers (users in other departments within the enterprise) can be measured, justified, and perhaps compared with those of outsourcing network providers. These concepts are applicable to the storage system environment.

Nevertheless, service providers must prove the value of services being delivered, particularly in light of the fact that these services are often obtained at a premium price. Companies are investing hundreds of billions of dollars in technology in order to become even more competitive. To stay in business, a company's ability to transact business cannot be impeded because a database server is out of disk space. As soon as a piece of the IT infrastructure fails, critical business operations begin to suffer; so, it is crucial that IT organizations keep these indispensable operations functioning.

Accordingly, storage can't be an afterthought anymore because too much is at stake. Two new trends in storage are helping to drive new investments. First, companies are searching for more ways to efficiently manage expanding volumes of data and make that data accessible throughout the enterprise—this is propelling the move of storage into the network. Second, the increasing complexity of managing large numbers of storage devices and vast amounts of data is driving greater business value into software and services.

This is where a Storage Area Network (SAN) enters the arena. A SAN consists of a communication infrastructure, which provides physical connections; and a management layer, which organizes the connections, storage elements, and computer systems so that data transfer is secure and robust. The term SAN is usually (but not necessarily) identified with block I/O services rather than file access services. It can also be a storage system consisting of storage elements, storage devices, computer systems, and/or appliances, plus all control software, communicating over a network. Thus, a SAN is a high-speed network that allows the establishment of direct connections between storage devices and processors (servers) within the distance supported by a high-speed data link such as Fibre Channel. The SAN can be viewed as an extension to the storage bus concept, which enables storage devices and servers to be interconnected using similar elements as in local area networks (LANs) and wide area networks (WANs): routers, hubs, etc. SANs offer simplified storage management, scalability, flexibility, availability, and improved data access, movement, and backup.

To provide quality-of-service guarantees over a SAN, priority access must be given to the programs that need a fast response time. Without service level agreements, low-priority jobs would be allowed to take up a storage system's time when those jobs could be postponed a few fractions of a second.

A centralized server is used to provide SLA in a SAN infrastructure. The centralized server accumulates SLAs on storage performance commitments and produces real-time monitoring display on clients. This centralized server is referred to as a SLA server. The SLA server connects to multiple I/O service agents that reside in separate virtualization engines (processors) placed between application hosts and storage subsystems. Such agents are called performance gateways. An I/O performance gateway is disposed between multiple application hosts and multiple physical storage subsystems. The I/O performance gateways intercept I/O operations, send statistic data to the SLA server and take requests from the SLA server to throttle I/O operations when necessary. In such an environment, a reasonable large number of application hosts commonly share multiple storage subsystems.

The SLA server needs to control multiple gateways concurrently by quickly accessing the SLA database and analyzing the data against SLAs and policies in a parallel manner. The monitoring and throttling of block I/O operations is provided by inter-process communications. If the message passing from the SLA server to multiple I/O service agents becomes a bottleneck, the system will fail to satisfy the SLAs and therefore fail in its mission.

Data must be received from all the gateways within a certain poll interval. In prior systems, multiple threads are created and each thread is used to communicate with one agent. However, when lots of agents need to be managed or monitored by the system, a blocked send and receive on each agent will result delays due to two latencies: 1) write/send latency; and 2) read/receive latency.

It can be seen that there is a need for a method, apparatus and program storage device for providing send and receive operations in a non-blocking manner and using only a minimum number of threads to support all gateways for eliminating the latencies and providing real time responses.

SUMMARY OF THE INVENTION

To overcome the limitations in the prior art described above, and to overcome other limitations that will become apparent upon reading and understanding the present specification, the present invention discloses a method, apparatus and program storage device for providing non-blocking, minimum threaded two-way messaging.

The present invention solves the above-described problems by uses a Performance Monitor Daemon that provides one non-blocked thread pair per processor to support a large number of connections. The thread pair includes an outbound thread for outbound communication and an inbound thread for inbound communication. The outbound thread and the inbound thread operate asynchronously.

A program storage device readable by a computer tangibly embodying one or more programs of instructions executable by the computer to perform a method for providing non-blocking, minimum threaded two-way messaging is provided in accordance one embodiment of the present invention. The method of the program storage device includes providing at least one processor for controlling communication between SLA processes of the SLA services module and at least one I/O performance gateway and providing a thread pair associated with each of the at least one processors for processing inbound signals from the at lest one I/O performance gateway being sent to the SLA services module via an inbound thread and for processing outbound signals to the at least one I/O performance gateway received from the SLA services module via an outbound thread, wherein the inbound thread and the outbound thread operate asynchronously to provide non-blocking messaging.

In another embodiment of the present invention, a storage area network is provided. The storage area network includes a storage system for providing storage of system data, at least one application host running an application thereon and accessing data on the storage system, at least one I/O performance gateway, disposed between the at least one application host and the storage subsystem, for intercepting I/O operations, a database for storing service level agreements and a Service Level Agreement (SLA) server for controlling the at least one I/O performance gateways based on the service level agreements, wherein the at least one I/O performance gateway sending statistic data to the SLA server and taking requests from the SLA server to control I/O operations, wherein the SLA server further includes a database manager for maintaining connections to the database wherein service level agreements and performance data are maintained, an SLA services module for analyzing data and controlling actions based on the service level agreements and policy, an application server for communicating with clients to display monitoring information and for communication with the database manager and a performance monitor for communicating with the at least one I/O performance gateway to collect data and send throttling requests based upon signals from the SLA services module, wherein the performance monitor is configured to provide at least one thread pair for processing inbound signals from the at least one I/O performance gateway being sent to the SLA services module via an inbound thread and for processing outbound signals to the at least one I/O performance gateway received from the SLA services module via an outbound thread, the inbound thread and the outbound thread operating asynchronously to provide non-blocking messaging.

In another embodiment of the present invention, an SLA server is provided. The SLA server includes a database manager for maintaining connections to the database wherein service level agreements and performance data are maintained, an SLA services module for analyzing data and controlling actions based on the service level agreements and policy, an application server for communicating with clients to display monitoring information and for communication with the database manager and a performance monitor for communicating with the at least one I/O performance gateway to collect data and send throttling requests based upon signals from the SLA services module, wherein the performance monitor is configured to provide at least one thread pair for processing inbound signals from the at least one I/O performance gateway being sent to the SLA services module via an inbound thread and for processing outbound signals to the at least one I/O performance gateway received from the SLA services module via an outbound thread, the inbound thread and the outbound thread operating asynchronously to provide non-blocking messaging.

In another embodiment of the present invention, a performance monitor is provided. The performance monitor includes at least one processor configured for processing signals between at least one I/O performance gateway and SLA services module processes and a thread pair associated with each of the at least one processors, each thread pair processing inbound signals from the at least one I/O performance gateway being sent to the SLA services module via an inbound thread and for processing outbound signals to the at least one I/O performance gateway received from the SLA services module via an outbound thread, the inbound thread and the outbound thread operating asynchronously to provide non-blocking messaging.

In another embodiment of the present invention, a method for providing non-blocking, minimum threaded two-way messaging is provided. The method includes providing at least one processor for controlling communication between SLA processes of the SLA services module and at least one I/O performance gateway and providing a thread pair associated with each of the at least one processors for processing inbound signals from the at lest one I/O performance gateway being sent to the SLA services module via an inbound thread and for processing outbound signals to the at least one I/O performance gateway received from the SLA services module via an outbound thread, wherein the inbound thread and the outbound thread operate asynchronously to provide non-blocking messaging.

In another embodiment of the present invention, another storage area network is provided. This storage area network includes at least one application means for running an application thereon and for accessing data on the storage means, at least one gateway means, disposed between the at least one application host and the storage subsystem, for intercepting I/O operations, means for storing service level agreements and means for controlling the at least one I/O performance gateways based on service level agreements, wherein the at least one gateway means sends statistic data to the means for controlling and takes requests from the means for controlling to control I/O operations, wherein the means for controlling further includes means for managing and maintaining connections to the means for storing service level agreements, means for analyzing data and controlling actions based on the service level agreements and policy, means for communicating with clients to display monitoring information and for communication with the means for managing and maintaining connections to the means for storing service level agreements and means for communicating with the at least one gateway means to collect data and send throttling requests based upon signals from the means for analyzing data and controlling actions, wherein the means for communicating is configured to provide at least one thread means for processing inbound signals from the at least one gateway means being sent to the means for analyzing data and controlling actions via an inbound means and for processing outbound signals to the at least one gateway means received from the means for analyzing data and controlling actions via an outbound means, the inbound means and the outbound means operating asynchronously to provide non-blocking messaging.

In another embodiment of the present invention, another SLA server is provided. This SLA server includes means for managing and maintaining connections to the means for storing service level agreements, means for analyzing data and controlling actions based on the service level agreements and policy, means for communicating with clients to display monitoring information and for communication with the means for managing and maintaining connections to the means for storing service level agreements and means for communicating with the at least one gateway means to collect data and send throttling requests based upon signals from the means for analyzing data and controlling actions, wherein the means for communicating is configured to provide at least one thread means for processing inbound signals from the at least one gateway means being sent to the means for analyzing data and controlling actions via an inbound means and for processing outbound signals to the at least one gateway means received from the means for analyzing data and controlling actions via an outbound means, the inbound means and the outbound means operating asynchronously to provide non-blocking messaging.

In another embodiment of the present invention, another performance monitor is provided. This performance monitor includes at least one processing means configured for processing signals between at least one I/O performance gateway means and SLA services means and a thread means associated with each of the at least one processors, each thread means processing inbound signals from the at least one I/O performance gateway being sent to the SLA services module via an inbound means and for processing outbound signals to the at least one I/O performance gateway received from the SLA services module via an outbound means, the inbound means and the outbound means operating asynchronously to provide non-blocking messaging.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

Embodiments of the present invention include a method, apparatus and program storage device for providing non-blocking, minimum threaded two-way messaging. A Performance Monitor Daemon provides one non-blocked thread-pair per processor to support a large number of connections. A thread pair includes an outbound thread for outbound communication and an inbound thread for inbound communication. The outbound thread and the inbound thread may operate asynchronously.

Figure 1:
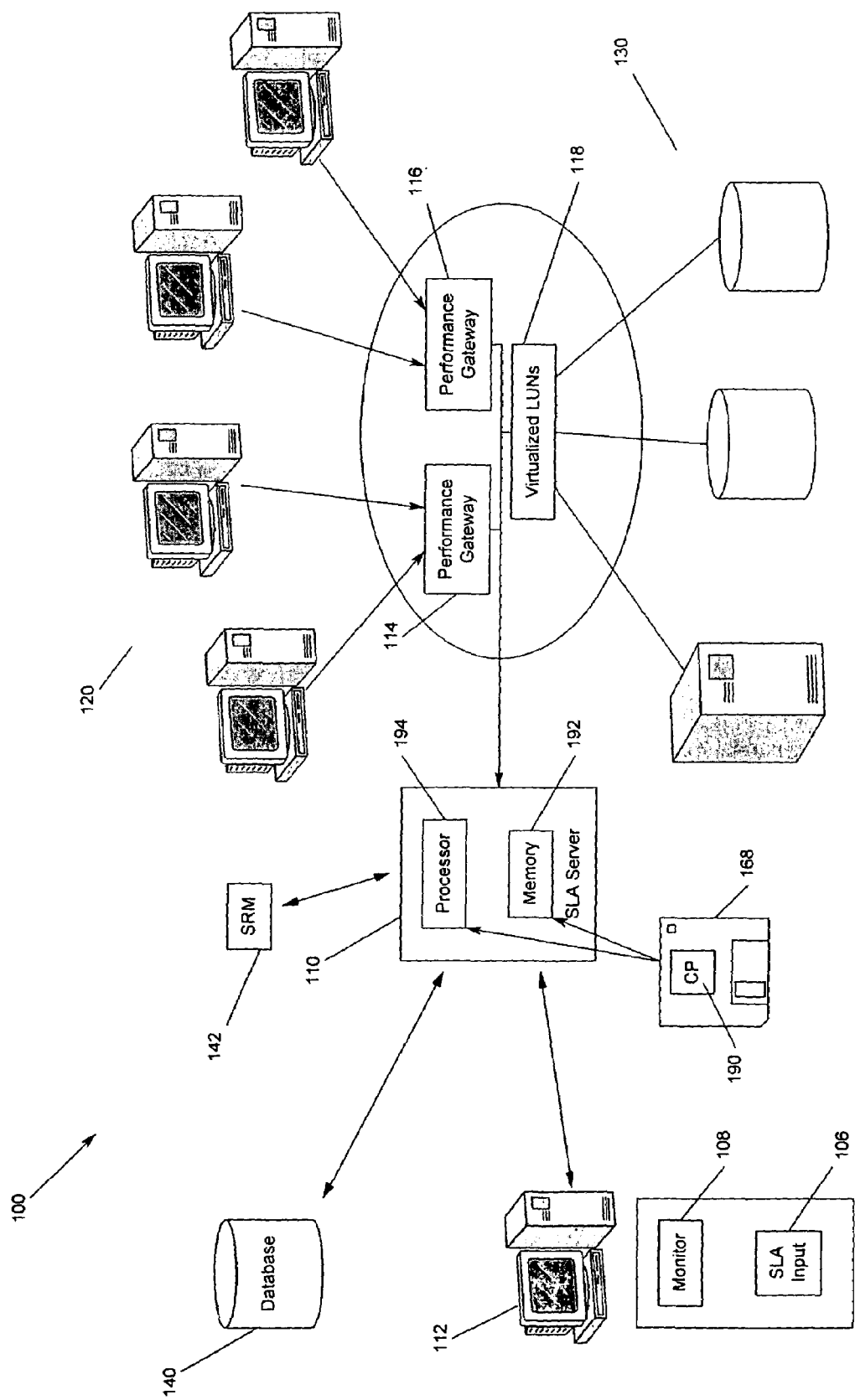
FIG. 1 illustrates a storage area network according to one embodiment of the present invention.

FIG. 1 illustrates a storage area network 100 according to one embodiment of the present invention. In FIG. 1, a Service Level Agreement (SLA) server 110 accumulates SLAs on storage performance commitments from SLA input 106 provided by SLA clients 112 and produces real-time monitoring display 108 on SLA clients. The SLA server 110 connects to multiple I/O performance gateways 114, 116 that reside in separate virtualization engines (processors). The I/O performance gateways 114, 116 are disposed between application hosts 120 and storage subsystems 130. The physical assets of each of the storage subsystems 130 are grouped into virtualized LUNs 118. The I/O performance gateways 114, 116 intercept I/O operations, send statistic data to the SLA server 110 and take requests from the SLA server 110 to throttle I/O operations when necessary. The SLA server 110 controls multiple I/O performance gateways 114, 116 concurrently by accessing the SLA database 140 and analyzing the data against SLAs and policies in a parallel manner. Storage resource manager 142 may be provided to monitor the storage servers 130 for disk space and to provide forecasting tools, alerts and policy-based automation. The monitoring and throttling of block I/O operations is provided by inter-process communications within the SLA server 110 as will be described below.

Figure 2:
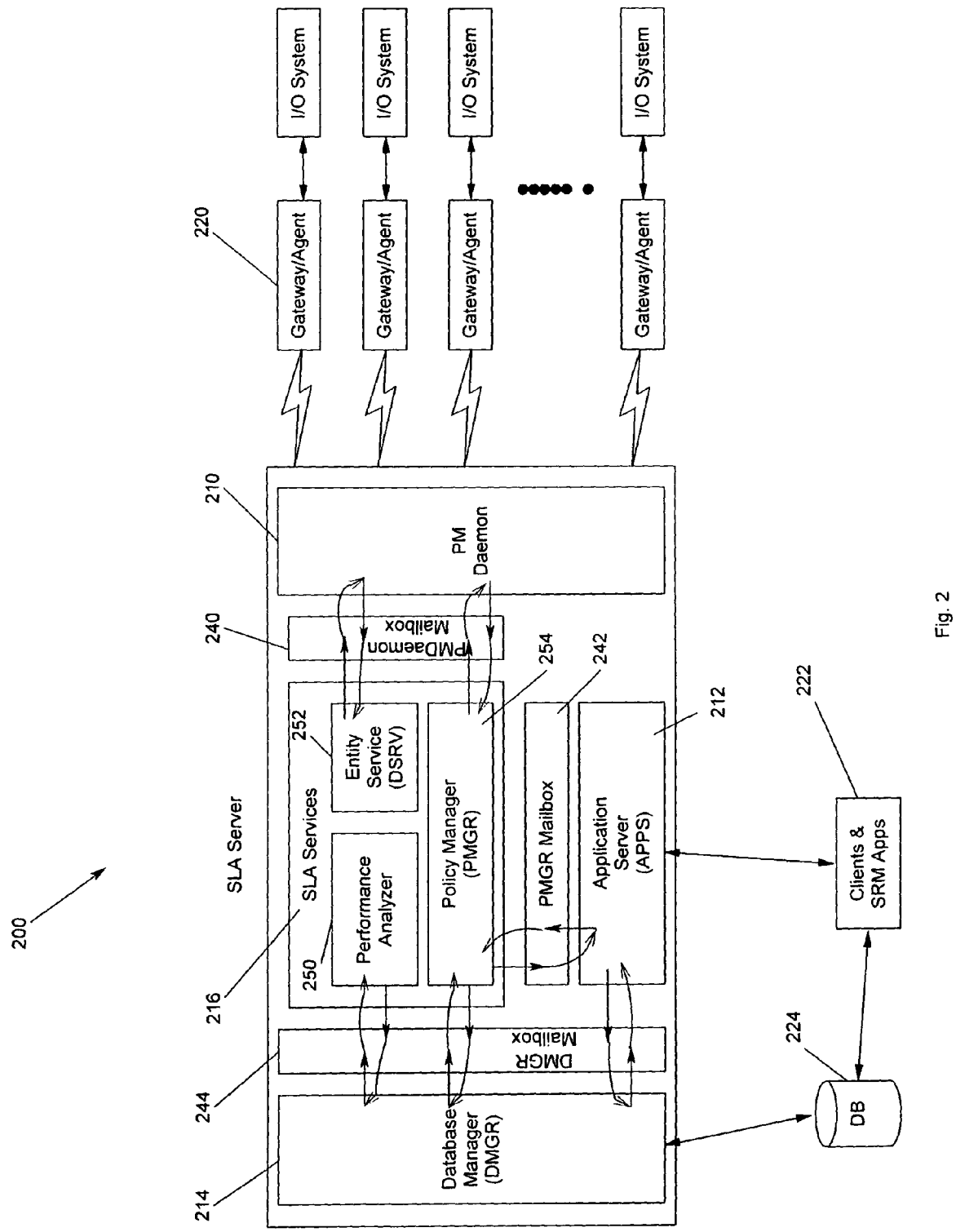
FIG. 2 illustrates the SLA server according to one embodiment of the present invention.

FIG. 2 illustrates the SLA server 200 according to one embodiment of the present invention. In FIG. 2, the SLA server 200 includes four processes to provide SLA control and inter-process communications. The four processes may be provided with separate address space in memory to provide protection from each other. The first process is the performance monitor daemon (PMDaemon) 210. The PMDaemon communicates with remote I/O service gateways 220 to collect data and send throttling requests.

The application server 212 communicates with a web servlet via the clients 222. The web servlet accepts user input and displays monitoring information on web clients 222. To perform these functions, the application server 212 must consistently collect performance data and send client request to SLA services 216. The application server 212 also communicates with a database manager 214.

The database manager 214 keeps multiple connections to the database 224. The database manager 214 retrieves and stores performance data. The SLA service 216 is a core server that analyzes data and controls actions based on service level agreements and policy.

The SLA services include processes for carrying out the functions of the SLA server. SLA Core Services include a Performance Analyzer 250, and in memory data caching components that communicate with the remote I/O gateways 220 in order to send a manual throttling request, or get the most recent performance data. The Performance Analyzer 250 sets throttling parameters and discovers new gateways 220. An Entity Service module 252 provides in-memory caching of collected statistical data by polling data from gateways 220. The Entity Service 252 also communicates with remote gateways 220 through a TCP/IP socket interface. The Policy Manager 254 ensures that actions meet service level agreements and policy rules.

FIG. 2 also shows mailboxes 240, 242, 244 disposed in the SLA server 200 along with the SLA services 216, the database manager 214, the application server 212 and the PMDaemon 210. The mailboxes 240, 242, 244 may be utilized to prevent inter-process communications from becoming a performance bottleneck. The mailboxes 240, 242, 244 thus may provide a non-blocking two-step communication scheme that allows concurrent servicing of multiple I/O requests and database requests.

Figure 3:
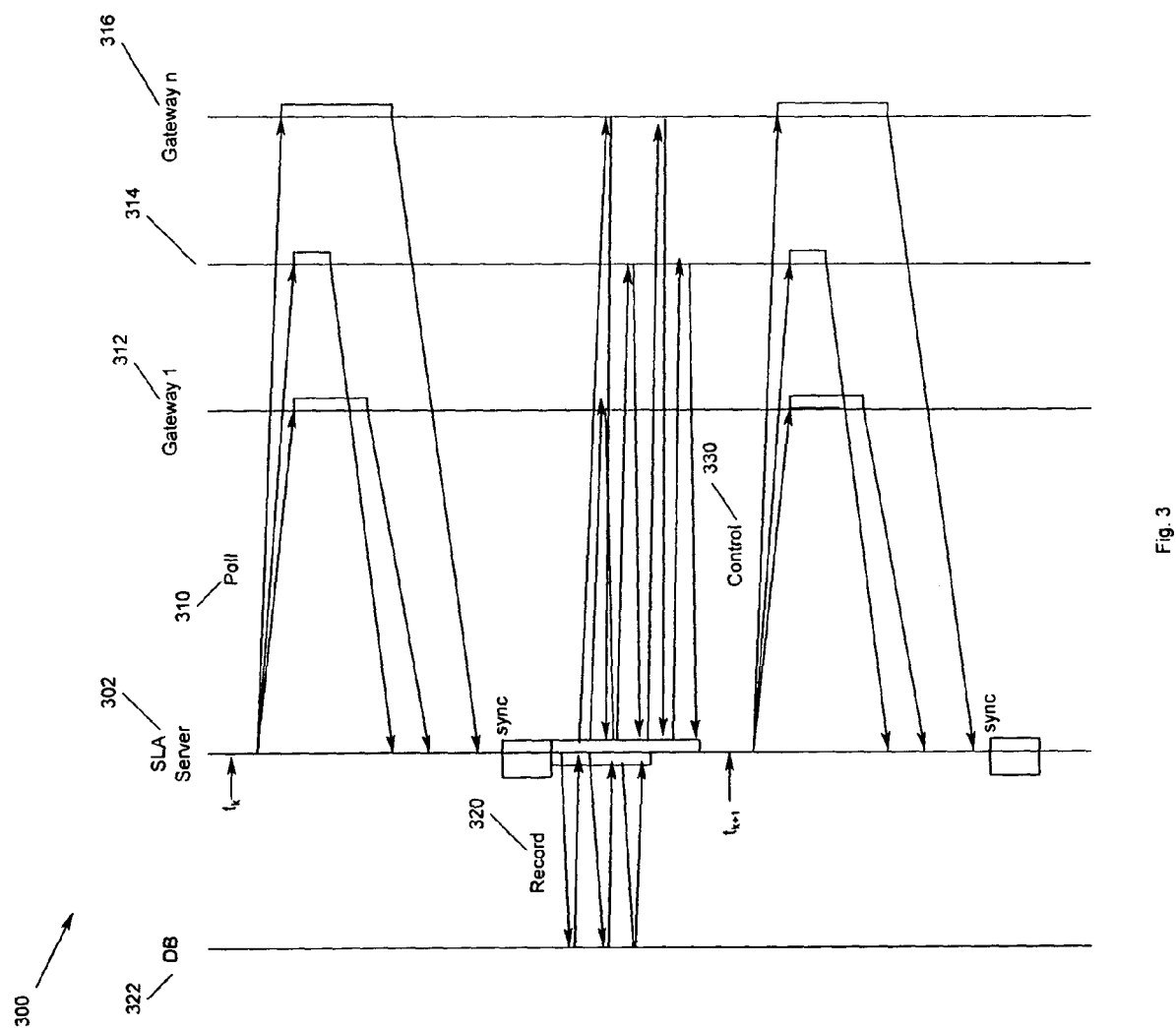
FIG. 3 illustrates the cyclic data flow involving the SLA server according to the present invention.

FIG. 3 illustrates the cyclic data flow 300 involving the SLA server according to the present invention. The SLA server 302 polls 310 the gateways 312-316 for performance data. A record 320 is provided to the database 322. The SLA server 302 also provides control to the gateways 312-316, e.g., sends throttle commands, and performs the discovery, authentication and registration of new agents 312-316.

Figure 4:
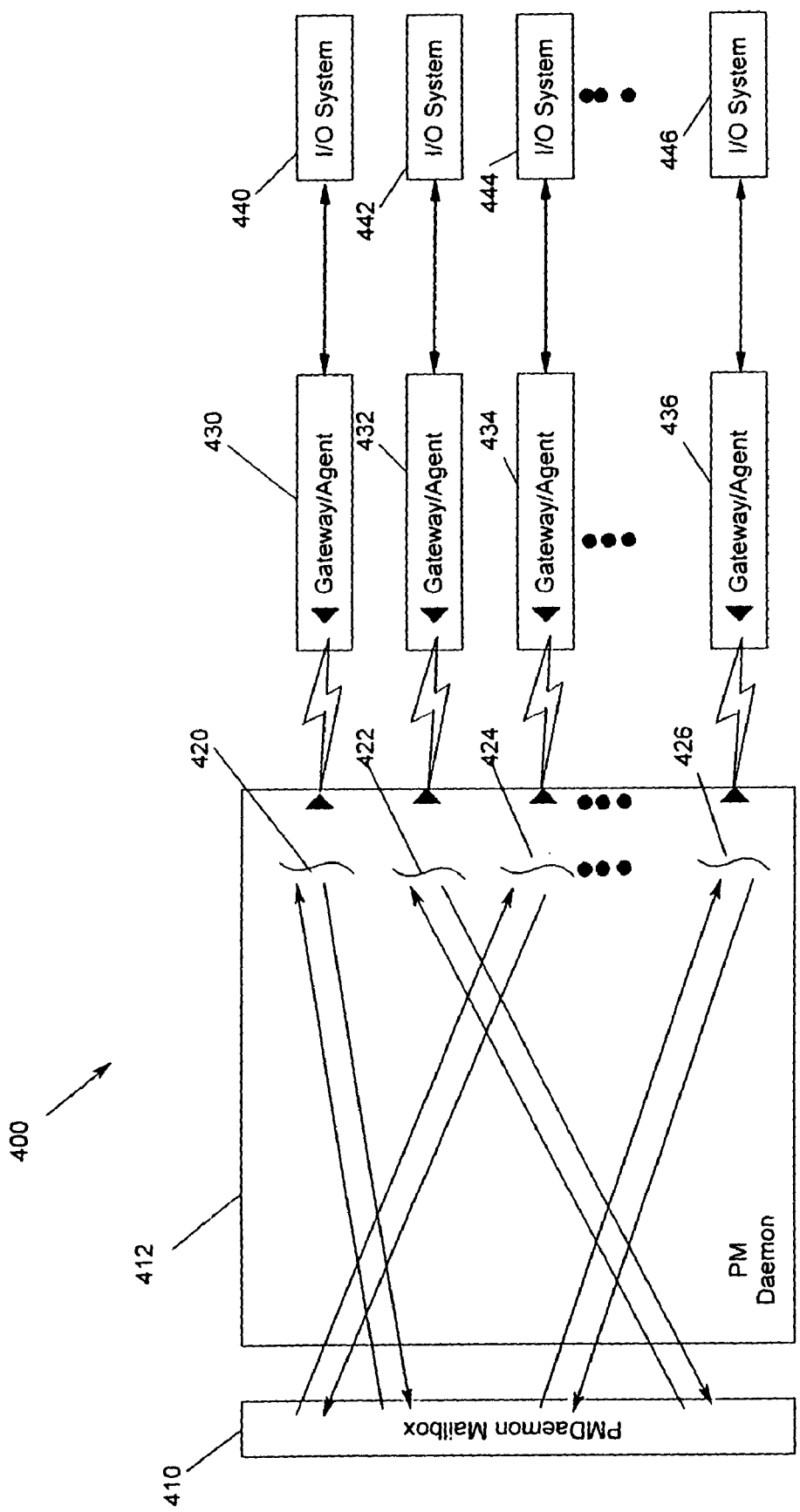
FIG. 4 illustrates synchronous messaging wherein a thread is used per connection.

FIG. 4 illustrates synchronous messaging wherein a thread is used per connection 400. In FIG. 4, messaging is provided from the PMDaemon mailbox 410 to the PMDaemon 412. A thread 420-426 is provided for each gateway 430-436. Each gateway 430-436 communicates with I/O systems 440-446. A thread 420-426 provided for each gateway 430-436 allows processes to communicate with remote gateways 430-436 directly. However, this would create a connection for each process/thread 420-426 and therefore use a huge amount of system resources. Scalability would obviously be an issue under such an arrangement. Furthermore, such an arrangement would cause messages to be blocked between processes.

Figure 5:
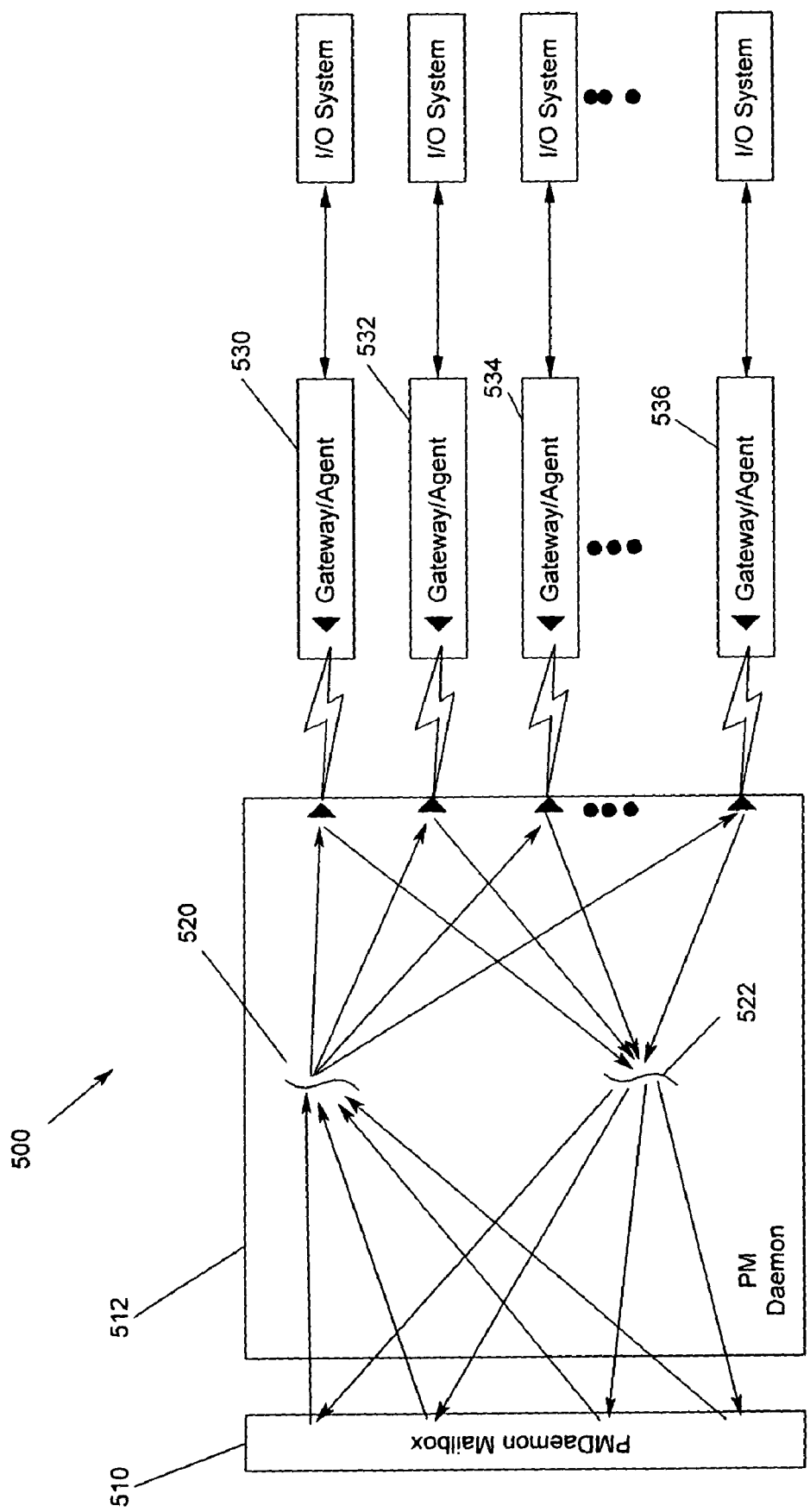
FIG. 5 illustrates a PMDaemon that uses one thread per processor according to an embodiment of the present invention.

FIG. 5 illustrates a PMDaemon that uses one thread per processor 500 according to an embodiment of the present invention. Again, In FIG. 5, messaging is provided from the PMDaemon mailbox 510 to the PMDaemon 512. The PMDaemon 512 uses a non-blocking, minimum threaded two-way message handling model wherein a single-thread-pair 520-522 for the multi-message scheme is used on a single processor machine. For one processor, one thread is good enough to do all non-blocked operation in one direction. The only time the thread has to wait is either when it has nothing to do, or when it is waiting for an I/O, or it is pre-empted. The PMDaemon 512 handles the communication from other SLA server components (not shown) to remote I/O gateways 530-536. Thus, the PMDaemon 512 is the only process in the SLA server to communicate with the remote gateways 530-536. This will prevent the blocking of the messages by the operating system. The function of PMDaemon 512 is to send commands to remote agents 530-536 and to receive solicited and unsolicited responses from these agents 530-536 on behalf of entire SLA Server. The PMDaemon 512 polls performance data, sends throttle commands, and performs the discovery, authentication and registration of new agents 530-536. The PMDaemon 512 also collects newly activated data access information. Because one PMDaemon 512 communicates with a large number of gateways 530-536, the PMDaemon 512 uses an asynchronous message-passing paradigm.

A thread-pair 520-522 is made up of two threads, one for outbound communication 520, and one for inbound communication 522. The outbound thread 520 is used to send requests to remote agents, driven by the messages sent from the SLA service components, such as Performance Analyzer or Database Manager. The outbound thread 522 does all CPU bound activities in one direction for its entire scheduling time slice which is normally 10 millisecond, unless it relinquishes the CPU because all tasks have completed and it is waiting for further messages from the mailbox, or unless it is being preempted by a high priority user or kernel thread.

After processing a request, the outbound thread 520 sends the message as a socket packet over TCP in a non-blocked fashion and continues to process the next request. That means, the PMDaemon 512 does not wait for the response across the network from an agent 530-536. It continuously processes all upcoming requests one by one. Thus, there is no wait time.

The inbound thread 522 is used to receive and process TCP packet sent by remote agents 530-536 via TCP. The inbound thread 522 continuously processes each packet and sends responding data to the rest of the components of the SLA Server via the mailbox mechanism 510. Accordingly, the PMDaemon 512 can support message exchange between a large number of gateways 530-536 and the other SLA server components.

The PMDaemon 512 thus plays the two-way communication role. In one direction, the PMDaemon 512 communicates with the rest components at the same SLA Server through an internal mailbox mechanism 510. The mailbox may be a two-step, non-blocking inter-process communication mechanism. The other processes of the SLA server may communicate with PMDaemon 512 through a mailbox 510 in a like manner.

Figure 6:
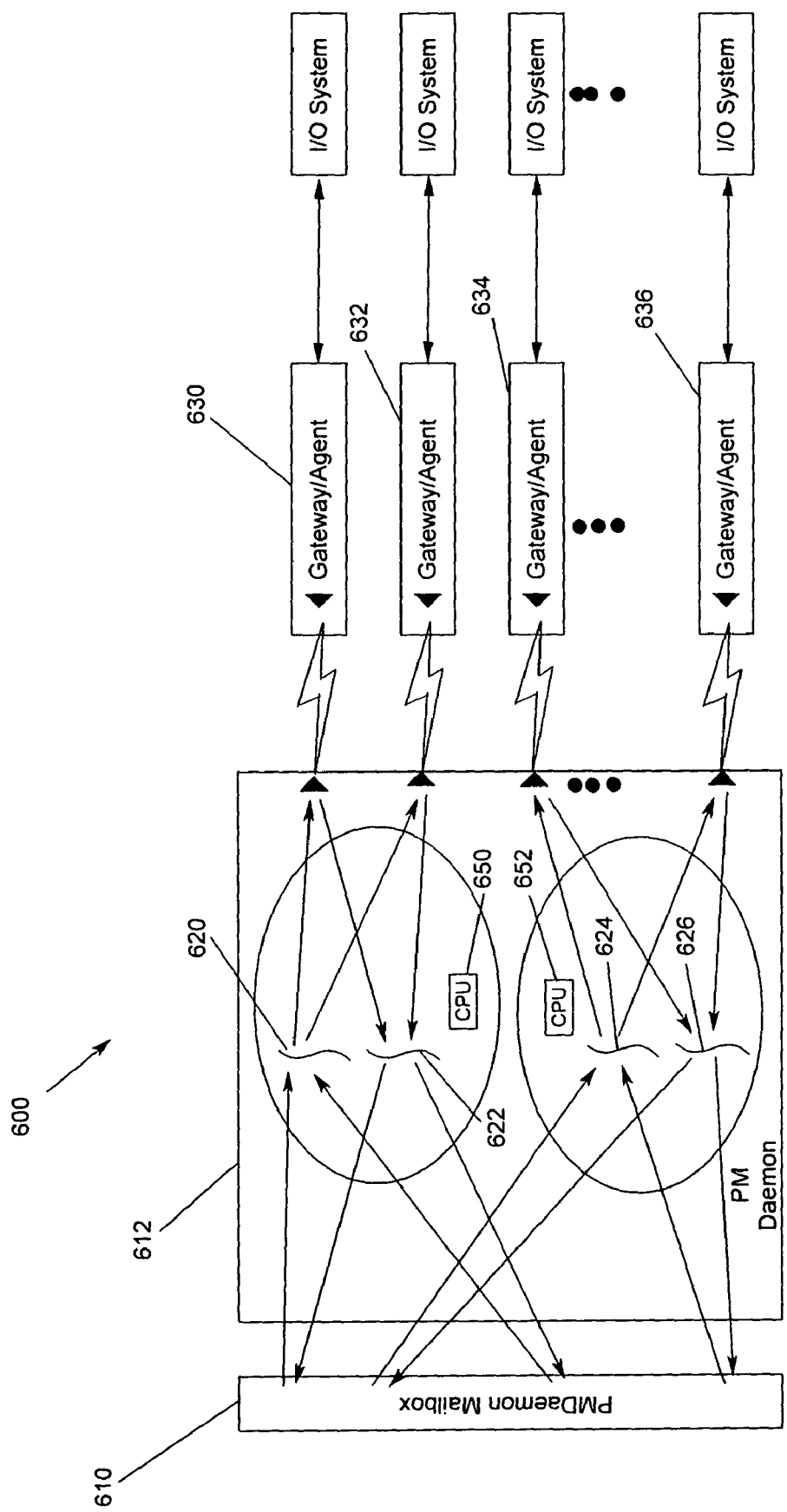
FIG. 6 illustrates a PMDaemon having two processors wherein a thread is provided for each processor according to an embodiment of the present invention.

FIG. 6 illustrates a system 600 wherein a PMDaemon includes two processors having a thread provided for each processor according to an embodiment of the present invention. Again, In FIG. 6, messaging is provided from the PMDaemon mailbox 610 to the PMDaemon 612. The PMDaemon 612 includes two processors 650, 652 with a thread pair 620-622, 624-626 provided for each processor 650, 652. Thus, multiple-thread-pairs 620-622, 624-626 for a multi-message scheme (one thread pair per processor) is used on multiprocessor machine to support a large number of connections with a minimum number of threads.

There are several key features of the two-way message handling model according to an embodiment of the present invention. The wait times derived from network I/O latencies is eliminated by continuous sending/receiving messages to overlap I/O operations. This results in improved real-time responses. Using multiple-thread-pairs 620-622, 624-626 for a multi-message scheme with minimum threads also eliminates the thread scheduling latencies. Scheduling latencies can be a major issue in large scaled environment where one SLA server controls many remote agents. However, if one thread per agent is used, then many threads will be created, and the cost of thread switching will be high. With minimum thread-pairs, thread switching time is not only reduced, but better translation lookaside buffer (TLB) and cache hits are provided along with faster memory access.

An additional feature of the non-blocking, minimum two-way messaging is scalability. Scalability may be provided on multiprocessor machines 650, 652 by dynamically spawning one thread-pair for each processor. Multiple-thread-pairs 620-622, 624-626 can run in parallel to increase scalability and reduce response time. In addition, dynamic load balancing may be achieved through sharing data from an idle thread on a multiprocessor machine 650, 652. The mobility of data blocks improves scalability when the number of gateways 630-636 increases. Further, using in-lined code to handle of a linked list of messages may reduce page-to-page jump and locking time. Still further, better packet management of TCP socket passing may be provided by message concatenation to achieve optimum use of network bandwidth and CPU time.

Figure 7:
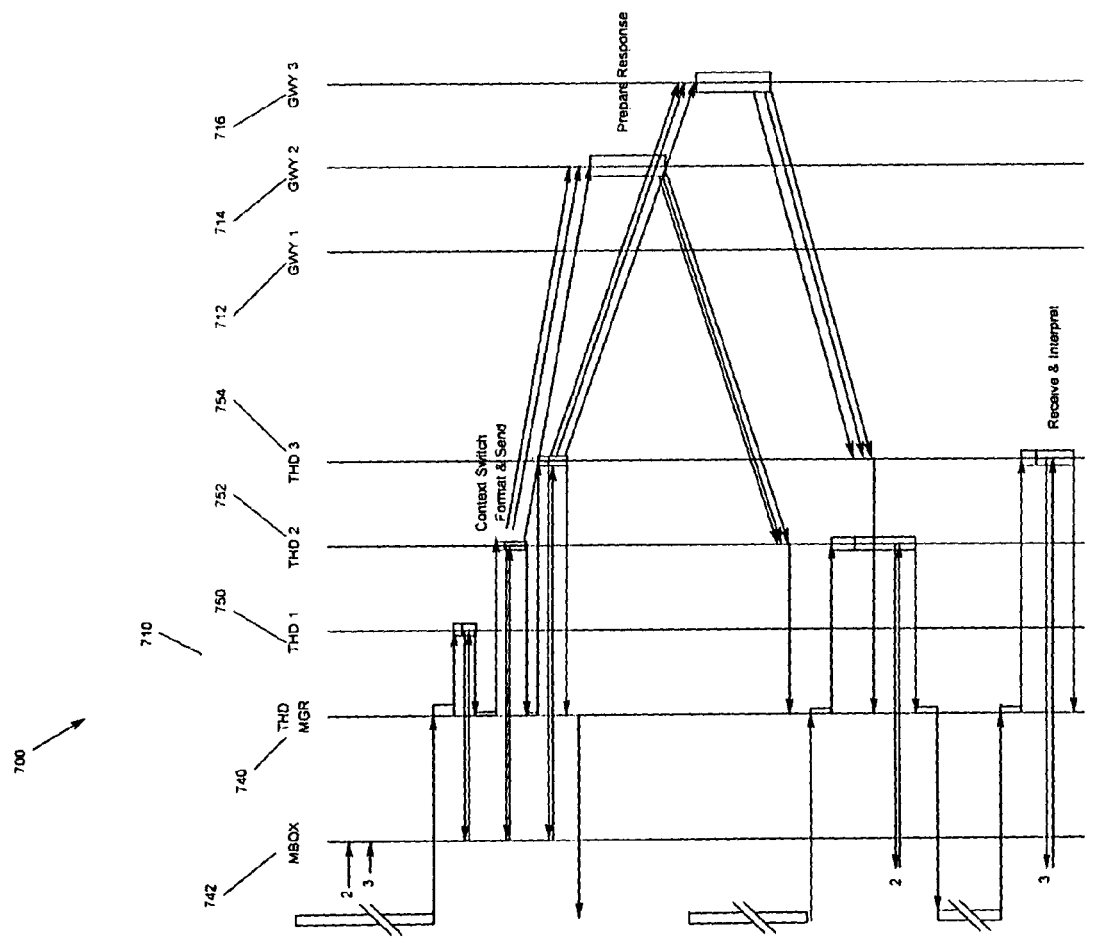
FIG. 7 illustrates the servicing of requests in a system having a thread-per-agent.

FIG. 7 illustrates the servicing of requests in a system having a thread-per-agent 700. In a single-processor machine, a task can run continuously until it gives up the CPU voluntarily or it is being sliced by the operating system scheduler when its time quantum expires or pre-empted by a higher priority task, or it waits for an operation that involves some latencies namely file or network I/O. In the synchronous message passing, the message sender needs to wait for the response from the receiver thus it was blocked network I/O. In Asynchronous message passing, the message sender does not wait for the response from receiver but continues to run therefore the network I/O does not block it.

In FIG. 7, one SLA server 710 is shown supporting a number of gateways 712-716. A thread manager 740 handles routing of messages from the mailbox 742 to the appropriate threads 750. In FIG. 7, the second thread 752 is shown handling all communication with gateway 2 714. The third thread 754 is shown handling all communication with gateway 3 716. However, a single thread, e.g., thread 752 could be used to handle all communication with all of the gateways 712-716.

When a single thread handles all gateways with synchronous send and receive, the total delayed time from when a task makes a I/O request until it receives the acknowledge from the receiver and starts running, can be divided into five time periods. The first time period, $t_1$, is the time to make the request of sending message that is normally taken by the kernel to format packet, peer-to-peer error checking and acknowledgment in case of TCP.

The second time period, $t_2$, is the time it takes to wake up the task in the remote machine and until the time it is in the ready queue before it gets CPU. The third time period, $t_3$, is the time it takes to service the request in the remote machine. The fourth time period, $t_4$, is the time it takes to schedule the service task in the remote machine and send the reply back. The fifth time period, $t_5$, is the time it takes to wake up the local machine task and until the time the task is in the ready queue before it gets the CPU. Accordingly, the delay to send/receive one message for one agent is equal to $t_1+t_2+t_3+t_4,+t_5$. The total delay to send/receive n messages to n gateways is $(n*(t_1+t_2+t_3+t_4,+t_5))$.

In a second example, one thread could handle one gateway with synchronous send and receive. The time for one thread to send/receive one message for one agent is equal to $t_1+t_2+t_3+t_4,+t_5$. Ideally, if there is no thread switch and other latency, and it is assumed that the server is able to create n threads for n gateways and run them in parallel, then the total delay for n threads to send/receive n messages to n agents could be $t_1+t_2+t_3+t_4,+t_5$.

However, this is not the case. Normally, the operating system of the SLA server is not able to create as many numbers of threads as many gateways. Therefore, a global pool of threads is created and managed in a queue, each thread will be suspended while waiting for an I/O, and the next ready thread will be run thereby achieving concurrence. The thread switching and state change overheads will cause the problem in this model.

The overhead is operating system dependent. For example, on Linux, threads handling the same code share text segment and all threads belonging to a process shares text, data segments and process kernel data structures including Page Directory Table and Page Table. The process virtual addresses from 0 to 4 GB is mapped via Page Directory and Page table, of which virtual addresses above 3 GB will have the same table as the Kernel Page table. The address space 0-3 GB contains the text, data, BSS, stack and dynamic shared memory areas. Multiple threads handling the same code can share the TLB entries, and page table entries in memory.

Figure 8:
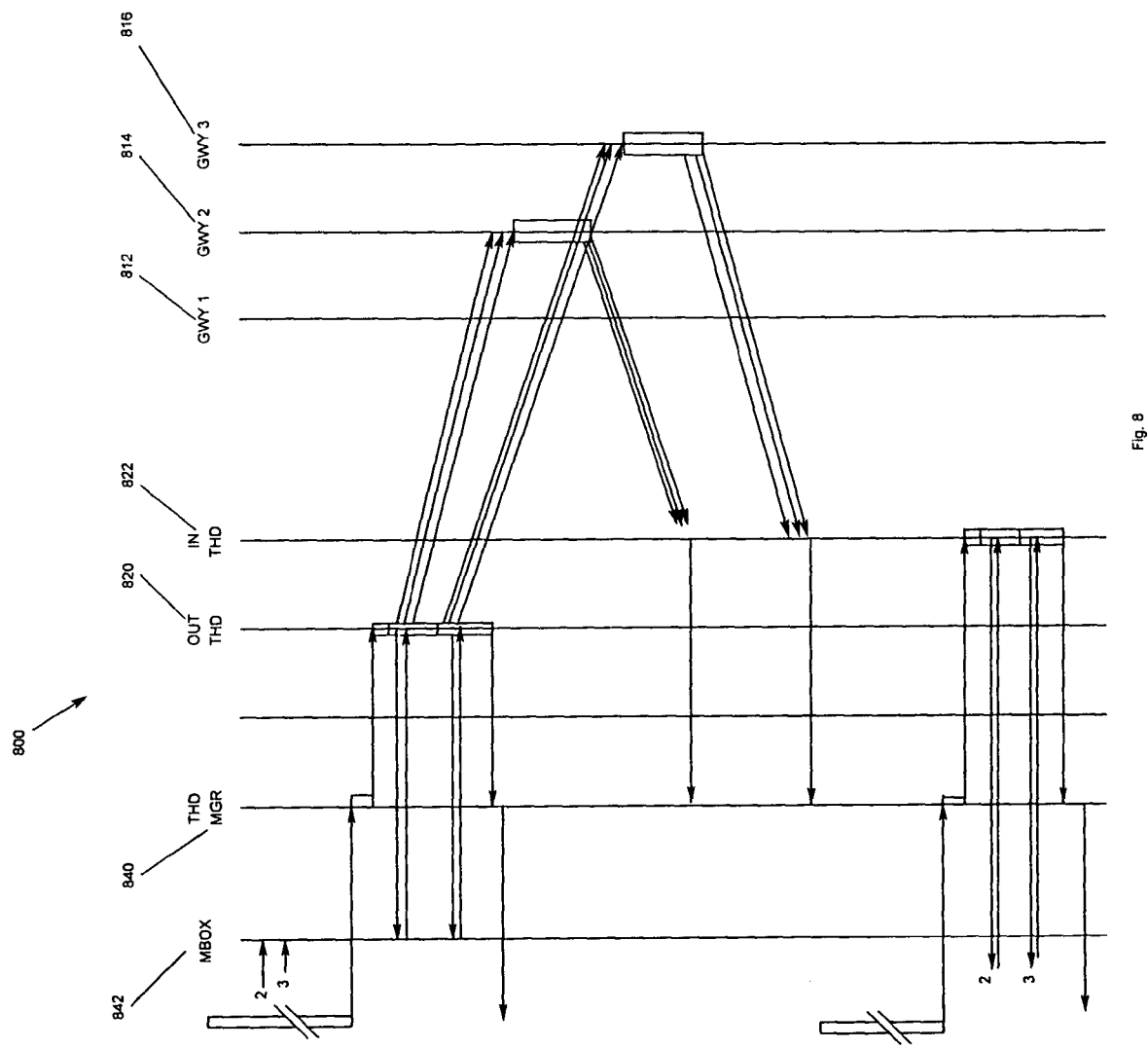
FIG. 8 illustrates the time to service a request using one thread pair according to an embodiment of the present invention.

When multiple threads are switched, the stack parameter virtual addresses map entries in TLB may be overwritten. Because multiple threads handle different data blocks corresponding to different connections, the result of TLB miss for data blocks may occur. Even though the thread code may not be swapped out of memory since it is shared and frequently used, multiple data blocks belonging to different threads may be swapped out due to more memory consumption. There is also a cost involved in thread switching since the thread registers and stack contents will have to be saved and restored every time a thread is suspended and another thread is run. Because of the issues mentioned above and also because of the threads state change latencies, there are some penalties involved while switching between large numbers of connections. Therefore the total time for multiple threads to send/receive n messages to n agents could be $t_1+t_2+t_3+t_4,+t_5$+thread switching time+other overheads FIG. 8 illustrates the servicing of requests 800 according to an embodiment of the present invention. A thread manager 840 handles routing of messages from the mailbox 842 to the appropriate threads 820, 822. In FIG. 8, a single thread pair 820, 822 handles all connections to the gateways 812-816 for non-blocked send and receives. A pair of threads 820, 822 is all that is required. However, as described above, a pair of threads 820, 822 may be provided for each processor. Each pair of threads 820, 822 includes an outbound 820 and an inbound 822 thread. The outbound thread 820 performs a non-blocked send to each gateway 814, 816, for example. In other words, the outbound thread 820 issues the send command with a no delay option to one gateway 814, and continues to the next gateway 816. Therefore the wait time, $t_1$, is equal to zero, except for sending the first message.

The inbound thread 822 is called when an I/O arrives on the network channel. The inbound thread 822 was given the information on which channels have received data or on which channels the blocked condition has ceased. The inbound thread 822 does not wait for the incoming messages, and only runs when messages arrive. Therefore the wait time of $t_2, t_3, t_4$ and $t_5$ can be eliminated. Therefore, the total delay to send/receive n messages to n agents is equal to zero plus some overhead.

Now the performance improvement of one thread pair 820, 822 for all the gateways 812-816 will be explained. For the inbound 822 or outbound 820 thread, the maximum time taken for packet processing is more or less fixed irrespective of the packet size, e.g., it may be less than 200 microseconds. On Linux, for example, the time quantum for user threads normally starts from 10 milliseconds. For a 10 millisecond time slice, the inbound 822 and outbound 820 threads can execute 50 commands or service 50 gateways before the scheduler suspend them. So 50 threads can be replaced by one thread pair 820, 822 with less thread switching and memory usage overheads.

A continuous flow of command sending and reply processing may be obtain by controlling scheduling and by minimizing the wait and wakeup between different user threads. Again an example using Linux will be provided.

Linux scheduling is based on the time-sharing technique. The CPU time is divided into slices for each process. The scheduling policy is based on ranking processes according to their priority. All real-time processes have assigned static priority while user processes are associated with dynamic priority which is derived from the base priority and remaining time slice in a given epoch.

Linux processes are pre-emptive when they are in the user context. However, the kernel is not preemptive. A process can have one of four states. The first state is the TASK_RUNNING state, wherein the process is either executing or waiting to be executed. The second state is the TASK_INTERRUPTABLE state, wherein the process is suspended until some conditions becomes true. A wakeup signal can change the TASK_INTERRUPTABLE state to TASK_RUNNING. The third state is the TASK_UNINTERRUPTABLE state, which is similar to the TASK_INTERRUPTABLE stated except that a signal wakeup leaves the TASK_UNINTERRUPTABLE state unchanged. The fourth state is the TASK_STOPPED state, wherein process execution has been stopped.

When a process enters in the TASK_RUNNABLE state, the kernel checks whether its dynamic priority is greater than the priority of the currently running process. If true, then the current process is interrupted and the new process is executed. Also process gets pre-empted when its time quantum expires. A preempted process is not suspended, it is still in TASK_RUNNING state, but is not running on any CPUs.

The Linux scheduling algorithm works by dividing the CPU time into epochs. In a single epoch, every process has a specified time quantum whose duration is computed when the epoch begins. When a process has exhausted its time quantum, it is pre-empted and replaced by another process in TASK_RUNNABLE state. A process can be scheduled several times in the time epoch, if its time quantum has not expired. The epoch ends when all the runnable processes have exhausted their time quantum.

On Linux the timer interrupt services the timer ISR once in every 10 milliseconds. The scheduling states are changed during this interval and the scheduler is invoked if any process is in a TASK_RUNNABLE state and its priority is higher. The priority is dynamic and is calculated from the base priority and its CPU time usage. Every process has a base time quantum. The minimum slice of a process within this quantum in an epoch is 10 milliseconds since that is the frequency of the scheduler timer. A process will run its 10 millisecond at any case without being switched in a worst-case scenario of multiple threads switching due to many wait and wakeups of many threads.

If modules are implemented as processes/threads and a synchronization mechanism is provided, a lot of CPU time is wasted for thread switching. Every time a thread is woken up it will be in a state capable of running and there is a good possibility that it will be scheduled before the other threads time quantum expires. Any events that are asynchronous can be initiated to take care of the I/O latency, however any synchronous task execution via multiple threads and wait and wakeup mechanism can cause a considerable waste of CPU usage through thread switching. Also as the number of process increases the calculation of dynamic priorities consumes more CPU time.

However, according to one embodiment of the present invention, the PMDaemon with the thread pair architecture may be implemented as an independent entity. Later, the outbound thread may be unified with a servercore thread to make a single thread and the inbound thread may be provided as a separate thread of the servercore. All command initiation can be performed by the servercore. The servercore may also perform polling without waiting to see whether any replies arrive. The inbound thread is driven by the events on the sockets that are opened. After a wakeup from an event (events), the inbound thread reads the data from the first socket port and decides to allow the servercore to continue processing the first data and subsequent reading of other replies through polling without delay, while the inbound thread waits until further initiation of the poll wait from the servercore. This is to prevent the inbound thread from being switched every time an event arrives on a socket.

For large system with a number of gateways beyond 50, additional thread pairs need to be created to give equal priority for all the gateways and to avoid starving of some gateways due to more CPU usage when gateway size increases. See, FIG. 6 for example. The equation for the number of thread pairs for n gateways can be summarized as the number of thread pairs is equal to:

$$\text{Roundup}(n/((T_{thr}*1000)/T_{ptmax}))$$

wherein $T_{thr}$ is the thread time quantum (in msec) and $T_{ptmax}$ is the maximum processing time of the gateway (in microseconds).

Performance and scalability is achieved by sharing the same text and data areas as the gateways increase resulting in better cache and TLB hits, reduced memory access, limited thread switching, additional threads per CPU, data block processing from another thread dynamically, minimum global variable sharing resulting in less locking overheads and also packet concatenation and disassembly if multiple packets needs to be sent to a gateway.

If the SLA server is a multiprocessor machines, then each processor 650, 652 could have one thread-pair 620-622, 624-626, respectively, to handle the message passing with certain number of gateways as shown in FIG. 6.

Returning to FIG. 1, the process illustrated with reference to FIGS. 1-8 may be tangibly embodied in a computer-readable medium or carrier, e.g. one or more of the fixed and/or removable data storage devices 168 illustrated in FIG. 1, or other data storage or data communications devices. A computer program 190 expressing the processes embodied on the removable data storage devices 168 may be loaded into the memory 192 or into the processor 194 of the SLA server 110 to configure the SLA server 110 of FIG. 1 for execution. The computer program 190 include instructions which, when read and executed by the SLA server 110 of FIG. 1, causes the SLA server 110 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A storage area network, comprising:
a storage system for providing storage of system data;
at least one application host running an application thereon and accessing data on the storage system;
at least one I/O performance gateway, disposed between the at least one application host and the storage subsystem, for intercepting I/O operations;
a Service Level Agreement (SLA) server, coupled in parallel with the at least one I/O performance gateway and the storage system, for controlling the at least one I/O performance gateways based on service level agreements; and
a database, coupled to the SLA server, for storing service level agreements; wherein the at least one I/O performance gateway sends statistics data to the SLA server and receives I/O control requests from the SLA server to control I/O operations of the performance gateway;
wherein the SLA server further comprises:
a database manager, coupled to the database, for maintaining connections to the database and for maintaining service level agreements and performance data in the database;
an SLA services module for analyzing data and controlling actions based on the service level agreements and policy;
an application server for communicating with clients to provide monitoring information for presentation at an SLA client and to provide communication between the database manager and the SLA client; and
a performance monitor, coupled to the SLA services module, for communicating with the at least one I/O performance gateway to collect data and send throttling requests based upon signals from the SLA services module, wherein the performance monitor is configured to provide at least one thread pair for processing inbound signals from the at least one I/O performance gateway being sent to the SLA services module via an inbound thread and for processing outbound signals to the at least one I/O performance gateway received from the SLA services module via an outbound thread, the inbound thread and the outbound thread operating asynchronously to provide non-blocking messaging.

2. The storage area network of claim 1 wherein the SLA services module further comprises:
a performance analyzer for setting throttling parameters and discovering new i/o performance gateways;
an entity service module for providing in-memory caching of collected statistical data by polling data from the i/o performance gateways; and
a policy manager for ensuring actions meet service level agreements and policy rules.

3. The storage area network of claim 1 further comprising a storage resource manager for monitoring the storage system.

4. The storage area network of claim 1 wherein the SLA server further includes a mailbox disposed between the SLA services module, the database manager, the application server and the performance monitor, the mailbox providing a non-blocking two-step communication scheme for allowing concurrent servicing of multiple I/O requests and database requests.

5. The storage area network of claim 1 wherein the performance monitor includes a plurality of processors for controlling communication, the at least one thread pair comprising a thread pair for each of the plurality of processors.

6. The storage area network of claim 5 wherein a thread pair for each of the plurality of processors are associated with a subgroup of SLA processes of the SLA services module and a subgroup of gateways.

7. The storage area network of claim 1 wherein the performance monitor includes a single processor for controlling communication, the inbound thread receiving signals from all gateways and providing a path to all processes of the SLA services module communicating with the performance monitor.

8. A Service Level Agreement (SLA) server, comprising:
a database manager, coupled to a database, for maintaining connections to the database and for maintaining service level agreements and performance data in the database;
an SLA services module for analyzing data and controlling actions based on the service level agreements and policy;
an application server for communicating with clients to provide monitoring information for presentation at an SLA client and to provide communication between the database manager and the SLA client; and
a performance monitor, coupled to the SLA services module, for communicating with at least one I/O performance gateway to collect data and send throttling requests based upon signals from the SLA services module, wherein the performance monitor is configured to provide at least one thread pair for processing inbound signals from the at least one I/O performance gateway being sent to the SLA services module via an inbound thread and for processing outbound signals to the at least one I/O performance gateway received from the SLA services module via an outbound thread, the inbound thread and the outbound thread operating asynchronously to provide non-blocking messaging.

9. The SLA server of claim 8 wherein the SLA services module further comprises:
a performance analyzer for setting throttling parameters and discovering new i/o performance gateways;
an entity service module for providing in-memory caching of collected statistical data by polling data from the i/o performance gateways; and
a policy manager for ensuring actions meet service level agreements and policy rules.

10. The SLA server of claim 8 wherein the SLA server further includes a mailbox disposed between the SLA services, the database manager, the application server and the performance monitor, the mailbox providing a non-blocking two-step communication scheme for allowing concurrent servicing of multiple I/O requests and database requests.

11. The SLA server of claim 8 wherein the performance monitor includes a plurality of processors for controlling communication, the at least one thread pair comprising a thread pair for each of the plurality of processors.

12. The SLA server of claim 11 wherein a thread pair for each of the plurality of processors is associated with a subgroup of SLA processes of the SLA service module and a subgroup of gateways.

13. The SLA server of claim 8 wherein the performance monitor includes a single processor for controlling communication, the inbound thread receiving signals from all gateways and providing a path to all processes of the SLA services module communicating with the performance monitor.

14. A storage area network, comprising:
   storage means for providing storage of system data;
   at least one application means for running an application thereon and for accessing data on the storage means;
   at least one gateway means, disposed between the at least one application host and the storage subsystem, for intercepting I/O operations;
   means, coupled in parallel with the at least gateway means and the storage means, for controlling the at least one gateways means based on service level agreements; and
   means, coupled to the means for controlling the at least on gateway means, for storing service level agreements, wherein the at least one gateway means sends statistic data to the means for controlling and receiving I/O control requests from the means for controlling to control I/O operations of the at least one gateway means;
   wherein the means for controlling further comprises:
      means, coupled to the means for storing service level agreements, for managing and maintaining connections to the means for storing service level agreements;
      means for analyzing data and controlling actions based on the service level agreements and policy;
      means for communicating with clients to provide monitoring information for presentation at an SLA client and to provide communication between the means for managing and maintaining connections to the means for storing service level agreements and the means for controlling the at least one gateway means; and
      means, coupled to the means for controlling the at least one gateway means, for communicating with the at least one gateway means to collect data and send throttling requests based upon signals from the means for analyzing data and controlling actions, wherein the means for communicating is configured to provide at least one thread means for processing inbound signals from the at least one gateway means being sent to the means for analyzing data and controlling actions via an inbound means and for processing outbound signals to the at least one gateway means received from the means for analyzing data and controlling actions via an outbound means, the inbound means and the outbound means operating asynchronously to provide non-blocking messaging.

15. A Service Level Agreement (SLA) server, comprising:
   means, coupled to a means for storing service level agreements, for managing and maintaining connections to means for storing service level agreements and for maintaining service level agreements and performance data in the means for storing service level agreements;
   means for analyzing data and controlling actions based on the service level agreements and policy;
   means for communicating with clients to provide monitoring information for presentation at an SLA client and to provide communication between the means for managing and maintaining connections to the means for storing service level agreements and the SLA client; and
   means, coupled to the means for analyzing data and controlling actions, for communicating with the at least one gateway means to collect data and send throttling requests based upon signals from the means for analyzing data and controlling actions, wherein the means for communicating is configured to provide at least one thread means for processing inbound signals from the at least one gateway means being sent to the means for analyzing data and controlling actions via an inbound means and for processing outbound signals to the at least one gateway means received from the means for analyzing data and controlling actions via an outbound means, the inbound means and the outbound means operating asynchronously to provide non-blocking messaging.

* * * * *